United States Patent [19]

Beirle

[11] Patent Number: 5,114,053
[45] Date of Patent: May 19, 1992

[54] ROTARY FEEDER FOR GRANULATED BULK MATERIAL

[75] Inventor: Walter Beirle, Ravensburg, Fed. Rep. of Germany

[73] Assignee: Waeschle Maschinenfabrik GmbH, Ravensburg, Fed. Rep. of Germany

[21] Appl. No.: 620,527

[22] Filed: Nov. 29, 1990

[30] Foreign Application Priority Data

Feb. 13, 1990 [DE] Fed. Rep. of Germany ....... 4004415

[51] Int. Cl.⁵ ............................................. G01F 11/10
[52] U.S. Cl. ..................................... 222/345; 222/368
[58] Field of Search ..................... 222/345, 368, 564; 414/219

[56] References Cited

U.S. PATENT DOCUMENTS

| | | | |
|---|---|---|---|
| 3,052,383 | 9/1962 | Transeau | 222/345 |
| 3,118,575 | 1/1964 | McCauley | 222/368 X |
| 4,537,333 | 8/1985 | Bjerregaard | 222/368 X |
| 4,823,993 | 4/1989 | Siegel et al. | 222/368 X |
| 4,986,455 | 1/1991 | Rambold | 222/368 |

Primary Examiner—Donald T. Hajec
Attorney, Agent, or Firm—Henry M. Feiereisen

[57] ABSTRACT

A rotary feeder for granulated bulk material includes a housing with a rotor by which the bulk material is transported from the supply well to the discharge well via a plurality of compartments. Arranged at the inner wall of the housing is a pocket-like recess which is defined by a pre-stripping edge and by a V-shaped stripping edge extending from the pre-stripping edge. The pocket-like recess is V-shaped, with its tip pointing in rotational direction of the rotor. A deflector partly fills the recess to substantially free the tip of the recess from bulk material grains and includes a tip pointing opposite to the rotational direction of the rotor, sides converging in this tip and ending at a distance from the stripping edge by about the means grain diameter of the bulk material, and a base extending in the generated cylindrical surface defined by the radial end faces of the rotor.

9 Claims, 2 Drawing Sheets

ROTARY FEEDER FOR GRANULATED BULK MATERIAL

BACKGROUND OF THE INVENTION

The present invention refers to a rotary feeder for granulated bulk material.

German Patent No. DE 34 45 710 C2 describes a rotary feeder of the type having a housing with a supply well ending in an inlet area with a pre-stripping edge extending along a section which is passed last by the rotor blades in rotational direction of the rotor. The pre-stripping edge runs about one to two grain diameters above the generated cylindrical surface defined by the rotating radially outer end faces of the rotor blades and is followed by a stripping edge which runs at the inner wall of the housing. In plan view, the stripping edge is V-shaped, with its tip pointing in rotating direction of the rotor, and includes two sections extending symmetrically to the plane of symmetry which is oriented perpendicular to the rotor shaft. Each section extends from a side cover of the housing to the tip which lies in the afore-mentioned plane of symmetry so that the sections of the stripping edge bound a pocket-like recess at the inner wall of the housing, with each section describing with the generatrix of the generated cylindrical surface defined by the radial end faces of the rotor blades an angle which corresponds at least to the angle of repose between the bulk material and the rotor material.

The particular constructive design of this prior art prevents grains of bulk material from being sheared off between the leading edges of the end faces of the rotor blades and the first housing edge passed by the blades. Jammed or sheared off grains of bulk material cause not only an overall power increase but also a characteristic hacking noise of the rotor as well as increased wear. In addition to the afore-mentioned pre-stripping edge and V-shaped stripping edge, the rotary feeder according to the DE 34 45 710 C2 requires the provision of a deflector or displacement body which is situated within the supply well. The deflector is dimensioned such that beneath the deflector the bulk material forms a sloped cavity which at least is equal to the volume of bulk material stripped by the stripping edge in direction to this sloped cavity. The use of such a deflector is disadvantageous as it necessarily obstructs the supply of bulk material in the supply well.

Without arrangement of such a deflector, other constructive means must be provided to ensure that at nominal speed of the rotor the amount of bulk material fed through the supply well is smaller than the volume of the compartment moving past the supply well Thus, the compartments are only partly filled in order to provide sufficient space for receiving granulates stripped off by the stripping edge. Hence, the metering volume cannot fully be utilized.

SUMMARY OF THE INVENTION

It is an object of the present invention to provide an improved rotary feeder obviating the afore-stated drawbacks.

In particular, it is an object of the present invention to provide an improved rotary feeder in which the supply of bulk material remains unobstructed within the supply well while the maximum filling volume of the compartments is still utilized and yet no jammed or sheared off grains of bulk material are encountered at the edge which is passed first by the end faces of the rotary blades.

These objects and others which will become apparent hereinafter are attained in accordance with the present invention by partly filling the V-shaped pocket-like recess with an essentially V-shaped deflector, the tip of which points opposite to the rotational direction of the rotor, with the sides converging in this tip being spaced from the stripping edge at a distance of about the mean grain diameter of the bulk material and with the base extending in the generated cylindrical surface defined by the rotating radial end faces of the rotor.

The features of the present invention are based on the teaching to keep the V-shaped tip of the stripping edge sections free from bulk material by ensuring that despite the omission of a hollow space in which the bulk material grains can be displaced no backup of bulk material is encountered in the area of this tip. To ensure this objective, the rear sides of the deflector which face the stripping edge sections should be distanced therefrom to define a gap therebetween which should be sufficiently dimensioned in order to permit single grains of bulk material to pass therethrough. Otherwise, if passing of grains of bulk material is impeded, the essentially V-shaped stripping edge would merely be substituted by an essentially W-shaped stripping edge, thus resulting in two pointed ends where grains of bulk material may accumulate.

According to a further feature of the present invention, the sides of the deflector define with the generatrix of the generated cylindrical surface which includes the end faces of the rotor blades an angle which at least corresponds to the angle of repose between the bulk material and the rotor material.

BRIEF DESCRIPTION OF THE DRAWING

The above and other objects, features and advantages of the present invention will now be described in more detail with reference to the accompanying drawing in which.

DETAILED DESCRIPTION OF A PREFERRED EMBODIMENT

Figure 1:
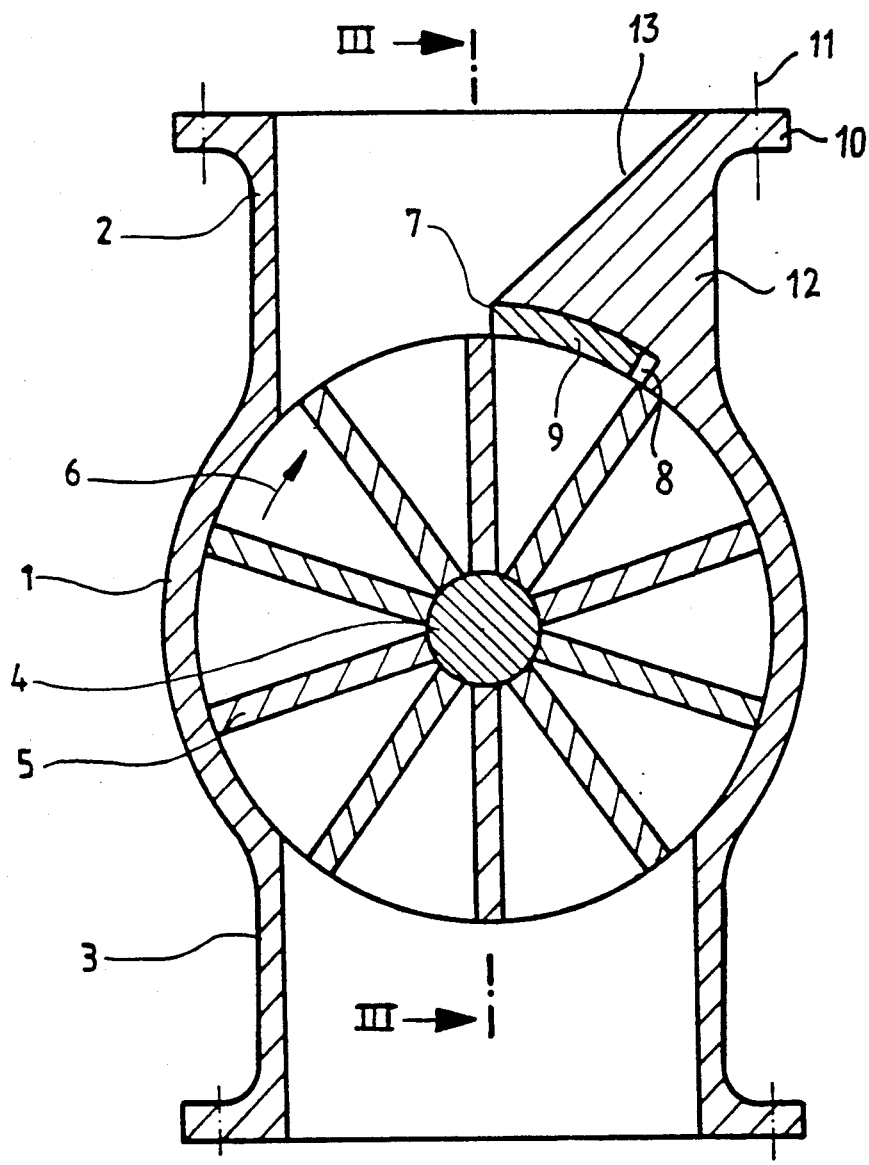
FIG. 1 is a sectional view of one embodiment of a rotary feeder in accordance with the present invention.
Figure 3:
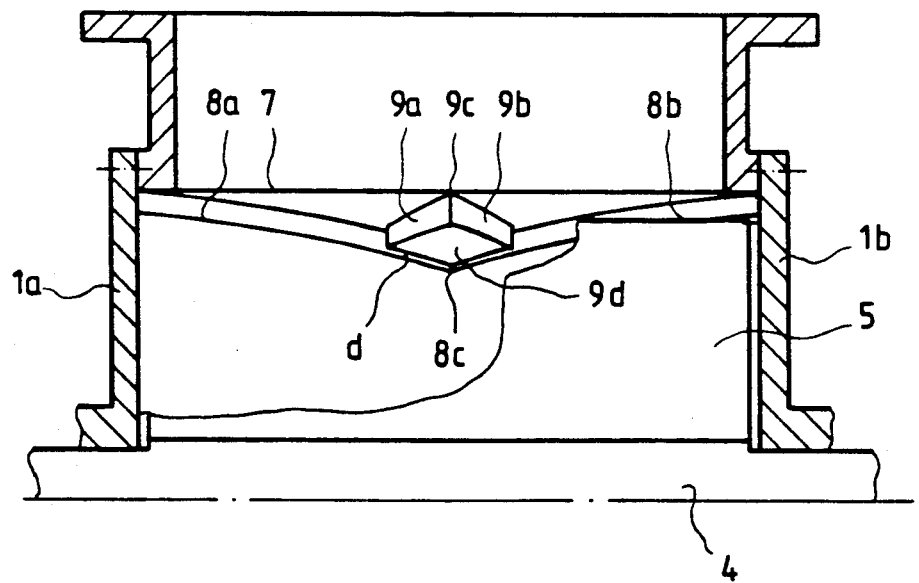
FIG. 3 is a partly sectional view of the rotary feeder taken along the line III—III in FIG. 1.

Referring now to the drawing, and in particular to FIG. 1, there is shown a rotary feeder including a generally cylindrical housing 1 which is connected in one piece with a top supply well 2 and a bottom discharge well 3. A cellular rotor is arranged in the interior space of the housing 1 and includes a plurality of vanes or blades 5 which define a plurality of compartments therebetween. The blades 5 are fixedly mounted on a rotor shaft 4 which traverses side covers 1a, 1b of the housing 1 (FIG. 3). Although not shown in detail, it will be understood that the rotating shaft 4 is sealingly supported in suitable housing bearings and is driven by a motor to rotate the rotor shaft 4 and its blades 5 in direction of arrow 6. Also a deaerating port or bore (not shown) may be provided at a proper location of the rotor of the housing 1.

The supply well 2 is provided with a flange 10 for allowing connection of the rotary feeder to e.g. the outlet of a silo (not shown) via suitable bores 11 which are indicated only schematically. Integrally connected with the supply well 2 is an insert 12 which is provided with a slanted surface 13 and extends inwardly from the inside wall of the supply well 2 to cover the part of the cross-sectional area of the supply well 2 which is passed last by the blades 5. Thus, the supply well 2 extends symmetrically relative to the mid-plane through the rotor shaft 4 while the free cross-sectional area of the supply well 2 is asymmetrical offset opposite to the rotating direction of the rotor. Persons skilled in the art will, however, recognize that the shape and structure of the insert 12 is made by way of example only. It is certainly conceivable to design the supply well with four straight (vertical) inner walls and to arrange it symmetrically or asymmetrical to the mid-plane of the rotor.

As shown in FIG. 1, the slanted surface 13 ends in a pre-stripping edge 7 which is the leading edge of the section passed last by the rotor blades 5 in rotating direction 6 and which bounds the inlet cross-sectional area of the supply well 2. The pre-stripping edge 7 extends about one to two grain diameters above the generated cylindrical surface described by the radial end faces of the rotor blades 5.

Figure 2:
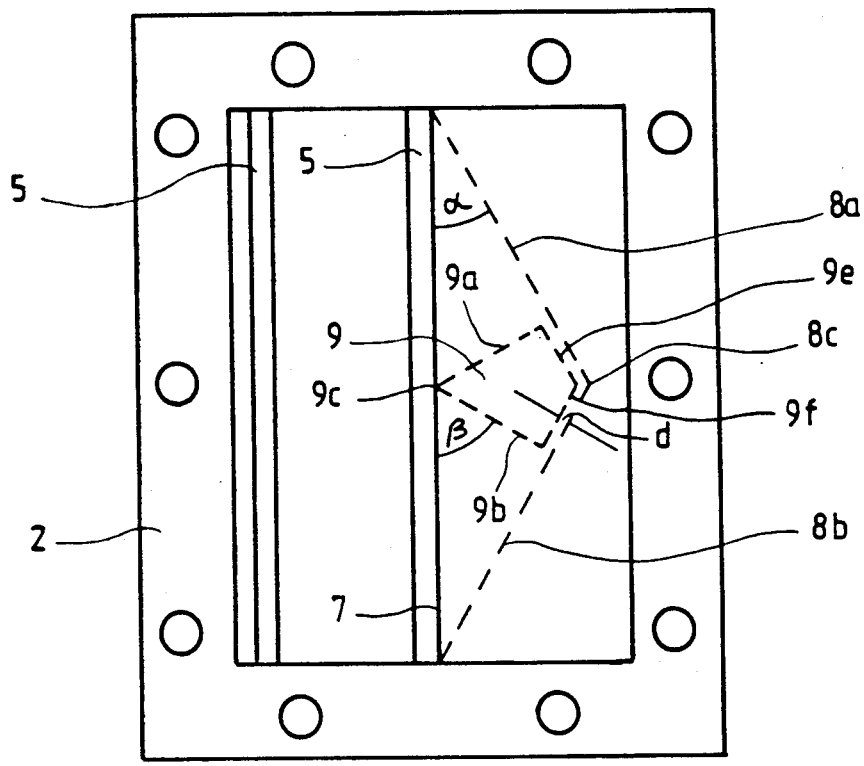
FIG. 2 is a plan view of the rotary feeder of FIG. 1.

As shown in FIGS. 2 and 3, the pre-stripping edge 7 is followed by a pocket-like recess 8 which is bounded by a V-shaped stripping edge as shown by the plan view of FIG. 2. The V-shaped stripping edge includes two symmetric sections 8a, 8b which extend from opposing side covers 1a, 1b of the housing 1 (FIG. 3) and converge in a tip 8c, with each section 8a, 8b defining with the generatrix of the generating cylindrical surface described by the radial end faces of the rotor blades, and thus in the position shown in FIG. 2, with the respective leading edge of a rotor blade 5 an angle α which at least corresponds to the angle of repose between the bulk material and the rotor material.

As shown in particular by the plan view in FIG. 2, the pocket-like recess 8 is partly filled by a deflector or displacement body 9 which is of essentially V-shaped configuration, with its tip 9c pointing in opposition to the direction of rotation 6 of the rotor. The deflector 9 has sides 9a, 9b which converge in this tip 9c and define with the generatrix of the generated cylindrical surface which includes the end faces of the rotor blades 5 an angle β which at least corresponds to the angle of repose between the bulk material and the rotor material Thus, the angle β may correspond to the angle α, although in the embodiment as shown in FIG. 2, the angle β is markedly greater than the angle α.

Opposite to the tip 9c, the deflector 9 is provided with rear sections 9e, 9f which extend parallel to the sections 8a, 8b of the stripping edge 8 at a distance to define a gap d therebetween which has a width in the range of preferably 2 to 6 times the mean grain diameter of the bulk material used for the rotary feeder. It should be understood that this range is required only for the narrowest point of the gap. However, in FIG. 2, the gap is shown of same width throughout because of the special design of the deflector 9 with its rear sections 9e, 9f extending parallel to the sections 8a, 8b. Such design is made by way of example only and thus the present invention should not be limited thereto.

As further shown in particular in FIGS. 1 and 3, the base 9d of the deflector 9 lies in the generated cylindrical surface defined by the rotating radial end faces of the rotor blades 5.

While the invention has been illustrated and described as embodied in a rotary feeder for granulated bulk material, it is not intended to be limited to the details shown since various modifications and structural changes may be made without departing in any way from the spirit of the present invention.

What is claimed as new and desired to be protected by Letters Patent is set forth in the appended claims:

1. A rotary feeder for granulated bulk material; comprising:

a housing including opposing side covers and having a supply well and a discharge well;

rotor means accommodated in said housing and including a plurality of radially extending blades mounted on a shaft and defining compartments for transporting the bulk material in rotational direction from said supply well to said discharge well, with said supply well ending in a cross-sectional area defined by an edge which is passed last by said rotor means in rotational direction and constitutes a pre-stripping edge which extends above the generated cylindrical surface described by the radial end faces of said blades by a distance of about one to two grain diameters and is followed by a V-shaped stripping edge including two sections extending from said side covers symmetrically to a plane of symmetry which runs perpendicular to said shaft and ending in a tip pointing in rotational direction of said rotor means and lying in said plane of symmetry so that said sections of said stripping edge define a pocket-like recess at the inner wall of said housing, with each section defining with the generatrix of the generated cylindrical surface described by the radial end faces of said blades an angle which at least corresponds to the angle of repose between the bulk material and the material of said rotor means; and a single deflector plate arranged in said pocket-like, recess in the area of said tip of said stripping edge and extending symmetrically to said plane of symmetry, said deflector being of substantial V-shape configuration and having a tip pointing in opposition to the rotational direction of said rotor means and arranged approximately below said pre-stripping edge, sides converging in this tip and ending at a distance from said sections of said stripping edge in the range of the mean grain diameter of the granulated bulk material so as to allow passage of single grains of bulk material therethrough.

2. A rotary feeder as defined in claim 1 wherein said sides of said deflector define with the generatrix of the generated cylindrical surface which is described by the end faces of said rotor blades an angle which at least corresponds to the angle of repose between the bulk material and the material of said rotor means.

3. A rotary feeder as defined in claim 1 wherein said deflector has a rear area facing said sections of said stripping edge and including two sections extending parallel to said sections of said stripping edge.

4. A rotary feeder as defined in claim 1 wherein said deflector has a base extending in the generated cylindrical surface defined by said rotating radial end faces of said rotary means.

5. A rotary feeder for granulated bulk material; comprising:

a housing with a supply well and a discharge well;

rotor means accommodated in said housing for transporting the bulk material in rotational direction from said supply well to said discharge well, with said supply well ending in a cross sectional area defining an edge which is passed last by said rotor means in rotational direction and constitutes a pre-stripping edge which extends above the generated cylindrical surface defined by the rotating radial end faces of said rotor means and is followed by a V-shaped stripping edge to thereby define a pocket-like recess at the inner wall of said housing, said V-shaped stripping edge having a tip pointing in rotational direction of said rotor means; and a single substantially V-shaped reflector plate arranged in said pocket-like recess in the area of said tip of said stripping edge, said deflector having a tip which points opposite to the rotational direction of said rotor means and extends approximately below said pre-stripping edge, said deflector further including sides extending from said tip toward said stripping edge by about a mean grain diameter so as to allow single grains of the bulk material to pass therethrough.

6. A rotary feeder for granulated bulk material; comprising:

a housing with a supply well and a discharge well, said supply well having a width and including an insert defining a pre-stripping edge;

rotor means accommodated in said housing for transporting the bulk material in rotational direction from said supply well to said discharge well, said housing being provided with a pocket-like recess which is arranged above the radial end faces of said blades and extends along the width of said supply well from said pre-stripping edge in rotational direction of said rotor means; and a single deflector plate arranged in said pocket-like recess over only part of its width in a central location thereof and having a tip positioned generally at the midpoint of the width, which tip points opposite to the rotational direction of said rotor means and extends approximately below said pre-stripping edge, said pocket-like recess having a rear end face, and said deflector plate having sides extending from said tip toward said rear end face and ending at a distance spaced from said rear end face equal to at least the mean grain diameter as to allow single grains of the bulk material to pass therethrough.

7. A rotary feeder as defined in claim 6 wherein said deflector is essentially V-shaped.

8. A rotary feeder as defined in claim 6 wherein said pocket-like recess is defined by a V-shaped stripping edge which extends rearwardly in rotational direction from a leading pre-stripping edge by which the cross-sectional inlet area of said supply well is defined, said deflector having a rear area extending parallel to said stripping edge.

9. A rotary feeder as defined in claim 6 wherein said sides of said deflector define with the generatrix of the generated cylindrical surface which is described by the end faces of said rotor blades an angle which at least corresponds to the angle of repose between the bulk material and the material of said rotor means.

* * * * *